(12) United States Patent
Tachihara et al.

(10) Patent No.: US 6,502,296 B2
(45) Date of Patent: Jan. 7, 2003

(54) METHOD OF FABRICATING A LIGHT-SHIELDING BLADE COMPOSED OF BERYLLIUM-ALUMINUM ALLOY

(75) Inventors: Noribumi Tachihara, Tokyo (JP); Nobuyoshi Inoue, Tokyo (JP); Shigemi Takahashi, Tokyo (JP); Takao Ogawa, Tokyo (JP)

(73) Assignee: Copal Company Limited, Tokyo (JP)

( * ) Notice: Subject to any disclaimer, the term of this patent is extended or adjusted under 35 U.S.C. 154(b) by 100 days.

(21) Appl. No.: 09/756,172

(22) Filed: Jan. 9, 2001

(65) Prior Publication Data

US 2001/0001625 A1 May 24, 2001

Related U.S. Application Data

(62) Division of application No. 09/114,221, filed on Jul. 13, 1998, now Pat. No. 6,190,060.

(30) Foreign Application Priority Data

Jul. 16, 1997 (JP) ................................................. 9-207095

(51) Int. Cl.$^7$ ................................................. B21B 1/46
(52) U.S. Cl. ..................................... 29/527.4; 29/527.2
(58) Field of Search ................................. 396/452, 483, 396/484, 487, 488; 420/401, 528, 542, 544, 548; 29/527.1, 527.2, 527.4

(56) References Cited

U.S. PATENT DOCUMENTS

| 1,254,987 A | | 1/1918 | Cooper |
| 4,346,977 A | * | 8/1982 | Ooba ........................... 396/488 |
| 4,482,231 A | * | 11/1984 | Kato et al. ................... 396/452 |

FOREIGN PATENT DOCUMENTS

| JP | 57-141623 | 9/1982 |
| JP | 64-85749 | 3/1989 |
| JP | 7-333678 | 12/1995 |

* cited by examiner

Primary Examiner—David P. Bryant
(74) Attorney, Agent, or Firm—Nixon Peabody LLP; Thomas W. Cole

(57) ABSTRACT

A light-shielding blade material is provided that contributes to increased focal plane shutter speeds. A focal plane shutter has a front blade group and a rear blade group, each being composed of a plurality of light-shielding blades. At least one of these light-shielding blades is made of a Be—Al alloy material containing 40% by weight or more of Be, and has a thickness of 40 to 150 microns. This light-shielding blade is light in weight and high in stiffness, thereby significantly contributing the increased focal plane shutter speeds.

2 Claims, 7 Drawing Sheets

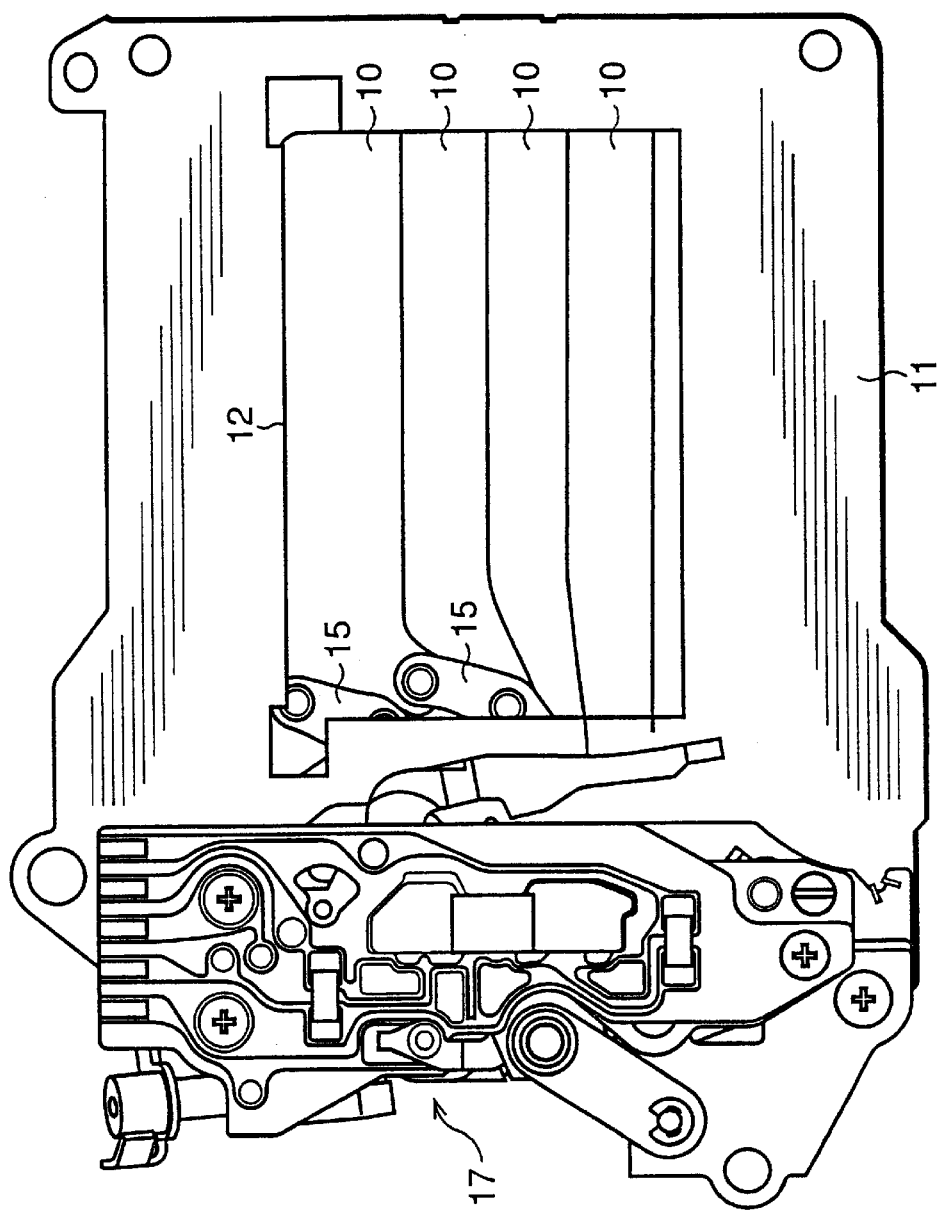

FIG.3

| | BERYLLIUM-ALUMINUM ALLOY | | |
|---|---|---|---|
| | 40%Be | 50%Be | 62%Be |
| SPECIFIC GRAVITY | 2.28 | 2.20 | 2.10 |
| MODULUS OF ELASTICITY GPa (Kgf/mm²) | 150 (15300) | 171 (17400) | 192 (19600) |

FIG.4

| BERYLLIUM-ALUMINUM ALLOY | MODULUS OF ELASTICITY GPa (Kgf/mm²) |
|---|---|
| Al—40%Be | 145 (14800) |
| Al—35.8%Be—3.8%Mg | 143 (14600) |
| Al—38.5%Be—1.5%Mg—0.5%Si | 146 (15100) |
| Al—62%Be | 192 (19600) |
| Al—57.9%Be—2.8%Mg | 199 (20200) |

FIG.5

| ITEM | | BLADE MATERIAL | | | | | |
|---|---|---|---|---|---|---|---|
| BENDING MOMENT (g·cm) | THICKNESS | Al–40%Be | Al–50%Be | Al–62%Be | CFRP | Al alloy |
| | 40 μm | 4.997 | 5.683 | 6.402 | | 2.286 |
| | 50 μm | 9.760 | 11.100 | 12.503 | | 4.465 |
| | 60 μm | 16.866 | 19.180 | 21.606 | | 7.716 |
| | 70 μm | 26.782 | 30.458 | 34.309 | 15.754 | 12.253 |
| | 80 μm | 39.978 | 45.465 | 51.213 | 23.516 | 18.290 |
| | 90 μm | 56.921 | 64.734 | 72.919 | 33.483 | 26.042 |
| | 100 μm | 78.081 | 88.798 | 100.026 | 45.930 | 35.723 |
| | 120 μm | 134.924 | 153.443 | 172.844 | 79.367 | 61.730 |
| | 150 μm | 263.524 | 299.694 | 337.586 | 155.014 | 120.566 |

FIG.7

| ITEM | | BLADE MATERIAL | | | |
|---|---|---|---|---|---|
| | THICKNESS | PET | Al alloy | CFRP | Be |
| BENDING MOMENT (g·cm) | 40 μm | 0.176 | 2.286 | 2.940 | 7.186 |
| | 50 μm | 0.344 | 4.465 | 5.741 | 14.034 |
| | 60 μm | 0.595 | 7.716 | 9.921 | 24.251 |
| | 70 μm | 0.945 | 12.253 | 15.754 | 38.510 |
| | 80 μm | 1.411 | 18.290 | 23.516 | 57.484 |
| | 90 μm | 2.009 | 26.042 | 33.483 | 81.847 |
| | 100 μm | 2.756 | 35.723 | 45.930 | 112.274 |
| | 120 μm | 4.762 | 61.730 | 79.367 | 194.009 |
| | 150 μm | 9.301 | 120.566 | 155.014 | 378.923 |
| SPECIFIC GRAVITY | | 1.41 | 2.67 | 1.50 | 1.84 |
| MODULUS OF ELASTICITY (kgf/mm²) | | 540 | 7000 | 9000 | 22000 |

METHOD OF FABRICATING A LIGHT-SHIELDING BLADE COMPOSED OF BERYLLIUM-ALUMINUM ALLOY

This application is a Divisional of application Ser. No. 09/114,221 filed Jul. 13, 1998, now U.S. Pat. No. 6,190,060.

BACKGROUND OF THE INVENTION

1. Field of the Invention

The present invention generally relates to a light-shielding blade that is for use in cameras and that is light in weight, high in stiffness, and suitable for high-speed drive.

2. Description of Related Art

A high-speed focal plane shutter is generally composed of a front blade group having four to five light-shielding blades and a rear blade group having four to five light-shielding blades that travel vertically. A light-shielding blade that operates at high speeds must be made of a material light in weight and high in stiffness. Conventionally, an aluminum alloy such as ultra-duralumin, a plastic such as PET film, and a carbon fiber reinforced plastics (CFRP) are used for the light-shielding blade material. Use of light-shielding blades made of such materials realizes a high-speed focal plane shutter of $1/8000$ second or $1/12000$ second, for example. However, each of these materials has both merits and demerits. Therefore, when assembling a focal plane shutter by combination of different types of blades, the high-speed driving operation is realized by appropriately selecting the material and thickness of each of the different blades. However, the conventionally available materials have reached their limitations because of increasing demands for still higher shutter driving speeds in addition to the requirement for higher qualitative stability and lower cost. For example, the above-mentioned CFRP, which has recently been put into practical use, is light in weight and high in stiffness and therefore is used for some high-speed focal plane shutters as a leading blade material. However, the CFRP has a drawback of making the light-shielding blade thicker than other materials, making it difficult to fabricate blades 20 microns or less in thickness. Further, the CFRP is not satisfactory in planarity, has locally created defects, and is extremely high in cost because of instability in fabrication. In addition, the CFRP is not a material sufficient for providing further higher shutter operating speeds. In addition to the above-mentioned conventional CFRP, the aluminum alloy, and the PET film already in practical use, there have been proposed various materials still under development. For example, Japanese Published Unexamined Patent Application No. Hei 7-333678 discloses a light-shielding blade made of an alloy of Mg—Li. However, this Mg—Li alloy has many problems to be solved such as chemical stability and resistance to corrosion, preventing the Mg—Li alloy from going into practical use. Other light-shielding blade materials that have been receiving attention include beryllium (Be) as disclosed Japanese Published Unexamined Patent Application Nos. Sho 57-141623 and Sho 64-85749.

It is essential for a blade material suitable for high-speed shutter driving operation to be light in weight and high in stiffness. This inevitably points at materials that are as low as possible in specific gravity and high in modulus of elasticity. The weight of a blade is determined by the specific gravity and the thickness of a material used. The stiffness of the blade depends on its thickness. Therefore, the weight of the blade can be reduced by thinning the thickness; however, this leads to reduced stiffness. Generally, a bending moment is used as a scale for representing stiffness. A smaller thickness leads to a lower bending moment. The relationship between the thickness and the bending moment is extremely important for the properties of the light-shielding blade.

Referring to FIG. 7, there is shown a table listing the properties of the blades made of the above-mentioned various materials. In the table, PET represents biaxially oriented polyethylene terephtalate. The aluminum alloy is a kind of duralumin. The CFRP represents a carbon fiber composite material laminated in three layers. The orientation of each layer is at right angles to that of an adjacent layer. The resin pickup relative to the carbon fiber is 40% by weight. The Be represents pure-metal beryllium. For the properties, the table lists the bending moment (g-cm), the specific gravity, and the modulus of elasticity (Kgf-mm$^2$). Since the light-shielding blade is made of an extremely thin sheet, the bending moment is measured with a Taber's stiffness tester (manufactured by Kumagaya Riki Kogyo Co., Ltd.). To be more specific, the tester measures a load P applied to a piece of sheet 50 mm long L and 38.1 mm wide W to bend the same to an angle of 15 degrees. The value of P×L denotes the bending moment. The value of the bending moment is obtained by simulation performed based on actual measurements obtained by varying the blade thickness between 40 and 150 microns. It should be noted that, for CFRP, the maximum values are listed for the bending moment and the modulus of elasticity because CFRP has anisotropy. As listed in the table, PET has the specific gravity of 1.41 and the modulus of elasticity of 540 (Kgf/mm$^2$). Aluminum alloy has the specific gravity of 2.67 and the modulus of elasticity of 7000 (Kgf/mm$^2$). CFRP has the specific gravity of 1.50 and the longitudinal modulus of elasticity of 9000 (Kgf/mm$^2$) and the lateral modulus of elasticity of 700 Kgf/mm$^2$). Pure-metal beryllium Be has the specific gravity of 1.84 and the modulus of elasticity of 22000 (Kgf/mm$^2$). With respect to the bending moment, aluminum alloy and CFRP are 10 times as high as PET, and pure-metal beryllium Be is two times as high as aluminum alloy and CFRP.

As seen from the above-mentioned comparisons, the pure-metal beryllium Be is remarkably prospective as a blade material. However, the Be metals are poor in rolling or calendering process. Therefore, rolling of the Be metals into a thin sheet significantly raises cost, preventing the Be metal sheet from becoming commercially available.

SUMMARY OF THE INVENTION

Meanwhile, a Be—Al alloy is known in making the most of the features of metal Be and has improved working properties. The be—Al alloy is disclosed in U.S. Pat. No. 1,254,987 for example. It is therefore an object of the present invention to put the above-mentioned alloy material into practical use as a blade material. To be more specific, the main purpose of the present invention is to improve the material composition, rolling method, and coating method for putting the Be—Al material into practical use, and to properly select the thickness and stiffness of the light-shielding blade according to its movement and speed, thereby realizing an ultra-high-speed focal plane shutter never attained conventionally.

In carrying out the invention and according to one aspect thereof, there is provided a light-shielding blade for use in a focal plane shutter of a camera having a front blade group and a rear blade group, each composed of a plurality of blades. The light-shielding blade is made of a Be—Al alloy containing 40% or more by weight of Be and having a thickness of 40 microns to 150 microns. Preferably, the Al content and thickness of the above-mentioned alloy material are selected so that the bending moment of the blade falls within a range of 5 to 300 g-cm according to the movement and speed at which the blade operates. Preferably still, when forming a sheet having a desired thickness by hot calendering by use of the above-mentioned alloy material beforehand, a material block is tightly held between planar plates having resistance to heat and being infusible for calendering. Then, the calendered material is cold-calendered or flat-sheeting into a sheet having a desired thickness, accuracy, hardness, and planarity for use as a light-shielding blade of cameras. Preferably yet, a material obtained by adding Mg or Si to the above-mentioned Be—Al alloy is used for a blade of cameras. Preferably again, the blade made of the above-mentioned alloy material is provided on both sides thereof with a black lubricant coating by dipping process.

The light-shielding blade associated with the present invention is made of the Be—Al alloy material containing 40% or more by weight of Be and has a thickness of 40 to 150 microns. This blade is more excellent in total properties than the conventional materials, especially featuring light weight and high stiffness. Use of this blade realizes an ultra-high-speed focal plane shutter. It should be noted that, if the content of Be goes below 40% by weight, the stiffness lowers, thereby making the material unsuitable for the high-speed shutter blade. Lowering the thickness of the blade below 40 microns causes a problem in the strength of the blade. On the contrary, raising the thickness of the blade beyond 150 microns increases the weight of the blade, which in turn increases the inertia moment, making the blade unsuitable for a high-speed shutter.

BRIEF DESCRIPTION OF THE DRAWINGS

These and other objects of the invention will be seen by reference to the description, taken in connection with the accompanying drawings, in which:

FIG. 2 is a top view illustrating an overall constitution of the focal plane shutter assembled with the light-shielding blade associated with the present invention;

FIG. 3 is a table listing values of specific gravity and stiffness of Be—Al alloy material, by which the light-shielding blade associated with the present invention is made;

FIG. 4 a table listing modulus of elasticity of materials obtained by adding Mg and Si to the Be—Al alloy;

FIG. 5 is a table listing bending moments of blade materials made of Be—Al alloy and others;

FIG. 7 is a table listing values of bending moment, specific gravity, and modulus of elasticity of various blade materials.

DETAILED DESCRIPTION OF PREFERRED EMBODIMENTS

Figure 1A:
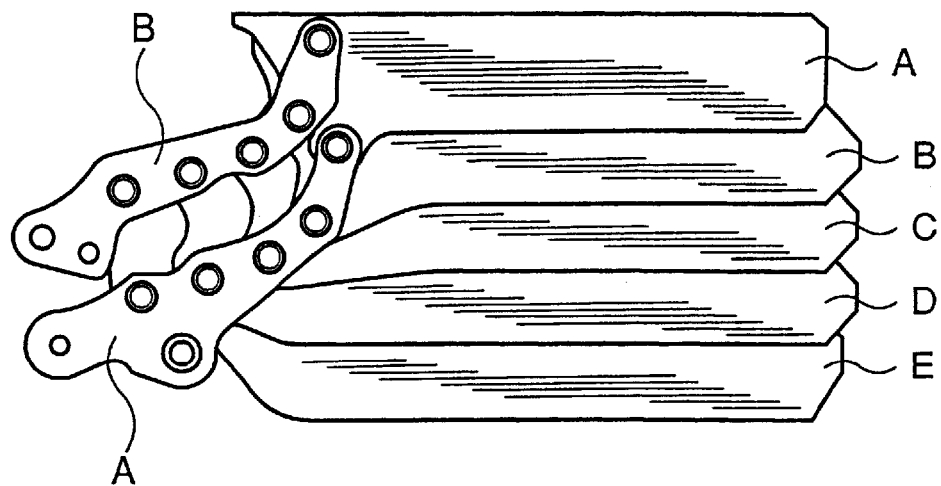
FIG. 1(A) and FIG. 1(B) are schematic top views illustrating a light-shielding blade associated with the present invention to be assembled into a focal plan shutter.
Figure 1B:
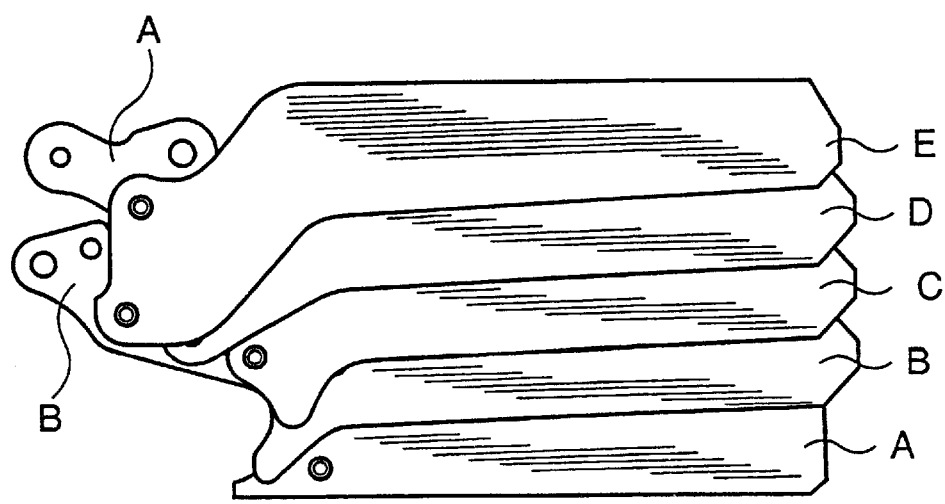

This invention will be described in further detail by way of example with reference to the accompanying drawings. Now, referring to FIGS. 1(A) and 1(B), there are shown schematic top views illustrating light-shielding blades according to the present invention to be assembled in a focal plane shutter of a camera. FIG. 1(A) illustrates a front blade group and drive arms for driving the front blade group. The front blade group is composed of five front blades A through E which overlap with each other. These front blades are driven to open and close by means of a pair of front drive arms A and B. FIG. 1(B) illustrates a rear blade group and drive arms for driving the same. The rear blade group is composed of five rear blades A through E. These rear blades are driven to open and close by means of the pair of rear drive arms A and B.

Referring to FIG. 2, there is shown an example in which the blades and the drive arms shown in FIGS. 1(A) and 1(B) are assembled in a focal plane shutter. A shutter base plate 11 is provided at the center thereof with a rectangle opening 12. In a rest state, a plurality of front blades 10 cover the shutter opening 12 in a partially overlapped manner with one another. Below the front blade group, the rear blade group, not shown, is arranged in an overlapped manner. To the left side of the base plate 11, a pair of drive arms 15 are pivotally mounted in a parallel relation to each other. Each of the front blades 10 is locked at the bottom thereof with the pair of drive arms 15. Likewise, the rear blade group is also locked with a pair of drive arms, not shown. These drive arms are operated by a power unit 17 mounted on the base plate 11 at the left end thereof. When an operator presses a shutter release button, the power unit 17 swings the drive arms upward. This swinging makes the front blades 10 travel upward vertically to open the opening 12. Then, the rear blade group, not shown, travels upward vertically to close the opening 12, upon which an exposure operation completes.

As described above, the focal plane shutter has the front blade group and the rear blade group, each composed of plural light-shielding blades. As one of the features of the present invention, at least one of these blades is made of a Be—Al alloy material containing 40% or more by weight of Be, the thickness of the blade being set to a range of 40 to 150 microns. As the Be content becomes less than 40% by weight, the value of the bending moment becomes less than 5 g-cm, reducing the strength of the blade, thereby making the blade unsuitable for use in a high-speed shutter. If the thickness of the blade becomes less than 40 microns, the value of the bending moment becomes less than 5 g-cm, making the strength of the blade insufficient. As the thickness becomes over 150 microns, the weight of the blade increases, making conspicuous the influence of inertia moment, thereby making the blade unavailable for high-speed shutter application. Thus, according to the present invention, the composition of the Be—Al alloy and the thickness of the blade are selected so that the bending moment of the blade falls within a range of 5 to 300 g-cm in consideration of the mechanical movement of the blade and the speed at which the blade operates. As described above, the bending moment of less than 5 g-cm causes insufficient strength. Conversely, the bending moment of over 300 g-cm requires the thickness up to about 150 microns, which is too heavy for one blade, making it unsuitable for an ultra-high-speed focal plane shutter. Generally, plural blades to be assembled in a focal plane shutter have different weights depending on shape, thickness, and material specific gravity. The individual blade has a different travel distance and a different travel speed, and therefore the required inertia moment and the bending moment must be within an optimum range. In the present invention, the blade made of Be—Al alloy is used. The blade has a bending moment appropriately selected from the above-mentioned range of 5 to 300 g-cm to achieve a high shutter speed of design target. The value of the bending moment of each blade associated with the present invention can be properly selected according to the desired shutter design. The above-mentioned selection range of the bending moment is intended for ultra-high-speed shutters. Generally, this bending moment range is determined for realizing shutter speeds of 1/8000 or higher.

Preferably, the Be—Al alloy material is formed into a sheet of desired thickness by hot calendering. In this process, the Be—Al alloy is sealed with a high-melting point metal to prevent surface oxidization. Alternatively, a material block may be tightly held for calendering between flat plates having resistance to heat and being infusible. Then, the material is cold-calendered or pressed between flat plates into a sheet having desired thickness, hardness, and planarity. The sheet thus formed is punched into a blade of a desired shape. In some cases, Mg or Mg and Si may be added to the be—Al alloy to form the material block. This addition can raise the stiffness of the material further, thereby enhancing the degree of freedom of thickness selection. Generally, black lubricant coating is applied to the blades in order to ensure smooth slide between the blades made of the Be—Al alloy material, and in order to form black non-reflecting surfaces on the blades. The blade material (hoop material) may be dip-coated on both sides with black lubricant coating to form the coating of a uniform thickness, thereby keeping the planarity in a good state after drying and curing of the coating. This improves the light-shielding and travel properties of the blade.

For the drive arms shown in FIGS. 1(A) and 1(B), the Be—Al alloy material containing 40% or more by weight of Be may also be used. In this case, the thickness of each drive arm is set to 50 to 300 microns. Focal plane shutters require light and highly stiff drive arms as with the blades. Therefore, it is appropriate to use the Be—Al alloy material for the drive arms. It should be noted that if the thickness of the drive arm is less than 50 microns, the strength necessary for supporting the blades cannot be ensured. On the contrary, if the thickness is over 300 microns, the shutter becomes too thick in the entire construction to be practical.

Thus, in order to make most of the features of Be as the practical blade material, the present invention uses the Be—Al alloy material suitable for high-speed shutters. As described above, from the relationship between the specific gravity and the stiffness, the metal Be is highly prospective as the material for light-shielding blades that operate at high speeds. As described above, FIG. 7 lists the values of the bending moment measured by the Taber's stiffness tester (Kumagaya Riki Kogyo Co., Ltd.) in a thickness range of 40 to 150 microns that is practical as light-shielding blades. As a preliminary state of the present invention, a sheet having a thickness of 50 microns is made of the pure metal Be. This sheet is formed into a blade, which is then assembled in the focal plane shutter shown in FIG. 2. In this prototype, the front blades A through E shown in FIG. 1(A) are all made of the Be material. For the sake of comparison, front blades A through C are made of the CFRP material and front blades D and E are made of the aluminum alloy. These front blades are also assembled in the focal plane shutter shown in FIG. 2. The shutter blind speeds of the resultant front blade groups of these focal plane shutters are measured. The shutter blind speed herein denotes a time in which the shutter travels a span of 24 mm vertically in the picture frame of a 135-sized camera. Comparison between the average values of 120 travel tests indicates that the shutter composed of the pure-metal Be blades is faster in shutter blind speed by 0.23 ms than the other shutter using the hybrid blades made of CFRP and aluminum alloy. However, from the viewpoint of practicality, the pure-metal Be material is very poor in the calendering properties. Forming this material into a sheet of about 40 to 100 microns in thickness is too costly to be practical. To circumvent this problem, the present invention uses the Be—Al alloy material obtained by compositing Be and Al.

FIG. 3 shows the specific gravity and the modulus of elasticity of the Be—Al alloy. The content of Be in the Be—Al alloy is changed in the range of 40%, 50%, and 62%. Stiffness is represented in terms of elastic modulus in tension (Young's modulus of elasticity) in unit of GPa. Values of the modulus of elasticity converted in Kg/mm$^2$ unit are also shown. As seen from FIG. 3, the Be content of the Be—Al alloy is in a range of 40 to 62% by weight and the specific gravity is in a range of 2.28 to 2.10. The modulus of elasticity is about 150 to 192 GPa (15300 to 19600 Kgf/mm$^2$). As compared with the modulus of elasticity value 303 GPa (22000 Kgf/mm$^2$) of the pure metal Be, the stiffness of the Be—Al alloy seems low. However, because the modulus of elasticity of currently used aluminum alloys is about 72 GPa (7000 Kgf/mm$^2$), the stiffness of the Be—Al alloy is comparatively excellent.

Currently, the CFRP material can be formed into a sheet of about 85 microns thick while the bending moment is in the order of 30 g-cm at most. In contrast, the Be—Al alloy can be formed into a sheet of about 70 microns thick while achieving higher stiffness.

Addition of Mg or Si to the Be—Al alloy can raise the stiffness further. FIG. 4 shows typical compositions with Mg and Si added and the modulus of elasticity of these materials. As seen from FIG. 4, adding Mg and Si may increase the modulus of elasticity. It should be noted that modulus of elasticity is represented in both GPa and Kgf/mm$^2$ in the list.

In assembling of a focal plane shutter, it is important to reduce the weight of each light-shielding blade and, at the same time, to ensure the thickness, accuracy, and planarity of the blade. The Be—Al alloy is high in workability as compared with the pure metal Be, but is still not so good in the ability of calender process. Therefore, it is necessary to device a working method that satisfies the requirements of this alloy as a blade material. It is also important to consider the cost of the Be—Al alloy in putting the same into practical use. Generally, the Be—Al alloy is obtained by blending powders of Be and Al and molding the blend by cold isotropic pressing. The resultant mold is then extruded in a sealed metal container or hot-calendered into a sheet. However, further ideas are necessary to fabricate with precision thin sheets such as used for shutter blades. The present invention uses an improved calendering method. In this method, a billet (namely a material block) obtained by powder molding is sliced as thin and accurate as possible. The resultant slices are then hot-calendered. In this process, the slice can be calendered by tightly holding the same between flat plates made of copper having resistance to heat and being infusible. The resultant sheet is then annealed in a non-oxidizing atmosphere. The annealed sheet is further cold-calendered or pressed by flat plates to ensure thickness accuracy and planarity and to provide appropriate surface hardening. This method proves that the desired blade material can be obtained comparatively less costly. One of the important features of the present invention is that the desired blade material can be obtained by appropriately selecting conditions of the calendering and the flat-plate pressing. To be more specific, the present invention proposes a method of fabricating a light-shielding blade for use in cameras. The inventive method forms by hot calendering a sheet having a desired thickness from the Be—Al alloy containing 40% or more by weight of Be. This method comprises the steps of calendering a material block by tightly holding the same between flat plates having resistance to heat and being infusible, cold-calendering or pressing by flat plates the resultant sheet such that the resultant sheet has a thickness of 40 to 150 microns and desired hardness and planarity, and optionally dip-coating the resultant sheet on both sides thereof with black lubricant coating.

In use of the Be—Al alloy for a focal plane shutter blade, the thickness of the blade is selected according to the movement and speed of each of the blades included in the front blade group and the rear blade group shown in FIGS. 1(A) and 1(B). In doing so, the most important design consideration is the relationship between the weight and the stiffness of the blade. FIG. 5 shows the relationship between the thickness and the bending moment of practically available Be—Al alloy thin sheets containing 40 to 62% by weight of Be. For the sake of comparison, the values of the bending moments of the CFRP sheet and the aluminum alloy sheet are also listed. The values listed in FIG. 5 are obtained by performing simulation based on the actual measurements of the bending moment values of Be—Al alloy thin sheet, CFRP laminated sheet, and aluminum alloy thin sheet in a thickness range of 40 to 150 microns in which these materials are possibly available as the blade materials. As seen from FIG. 5, if the Be content is less than 40% by weight and the thickness is less than 40 microns, the bending moment value goes below 5 g-cm, making it impossible for these materials to be available for high-speed shutters. If the thickness is less than 40 microns, the bending moment value goes below 5 g-cm, making it impossible in terms of strength for the Be—Al alloy to be used as the blade material for high-speed shutters. Conversely, if the thickness is over 150 microns, the blade becomes too heavy to be available as the high-speed shutter blade in terms of inertia moment. A focal plane shutter has a plurality of blades in the front and rear blade groups. Each of these blades has a different weight depending on its shape and thickness. Each of these blades also has a different inertia moment required by travel distance and speed. If the Be—Al alloy is used for the blade material, the thickness suitable for a desired shutter speed is selected based on the bending moment values shown in FIG. 5. Generally, the material and the thickness of the blade are selected based on the blind speed and the motion of the shutter. In this selection, it is important to properly set a specific stiffness representing the relationship between the specific gravity and the bending moment. As seen from FIG. 5, in designing each of the blades constituting a focal plane shutter, combinations of material and thickness of each blade can be widely selected. For example, the CFRP blade material is used in a focal plane shutter having 1/12000 second shutter speed, which is the fastest shutter speed. The CFRP blade has a thickness of 80 microns and a bending moment of 23.5 g-cm. Combining this CFRP blade with the Be—Al alloy blade for forming a camera shutter can further increase the shutter speed.

For camera shutters, black spray coating is generally performed on the surface of the blade material in order to prevent reflection and in order to lubricate sliding surfaces of the blades. When the black spray coating is performed, however, warp or deformation may be caused after oven-drying due to a difference in thickness and film quality between front-surface and rear-surface coating layers of the blade material, thereby hampering planarity of the blade. In order to prevent this problem, the present invention adopts concurrent dip-coating of the front and rear sides of the blade material with a newly developed coating material. Then, the dip-coated blade material is dried and cured. This method can produce a blade having a uniform coating thickness, good planarity, and high practicality. Namely, in the present invention, a black lubricant coating is applied to both sides of the blade by dip-coating. This black lubricant coating contains carbon and other matters, practically securing light-shielding properties necessary for a camera shutter blade and, at the same time, satisfying lubricity, durability, anti-reflectivity, resistance to scratch, and resistance to solvent attack. The black lubricant coating is a so-called functional coating obtained by mixing several tens of matters such as resin, anti-reflection agent, lubricant, black pigment, dispersing agent, hardener, and thinner.

Figure 6:
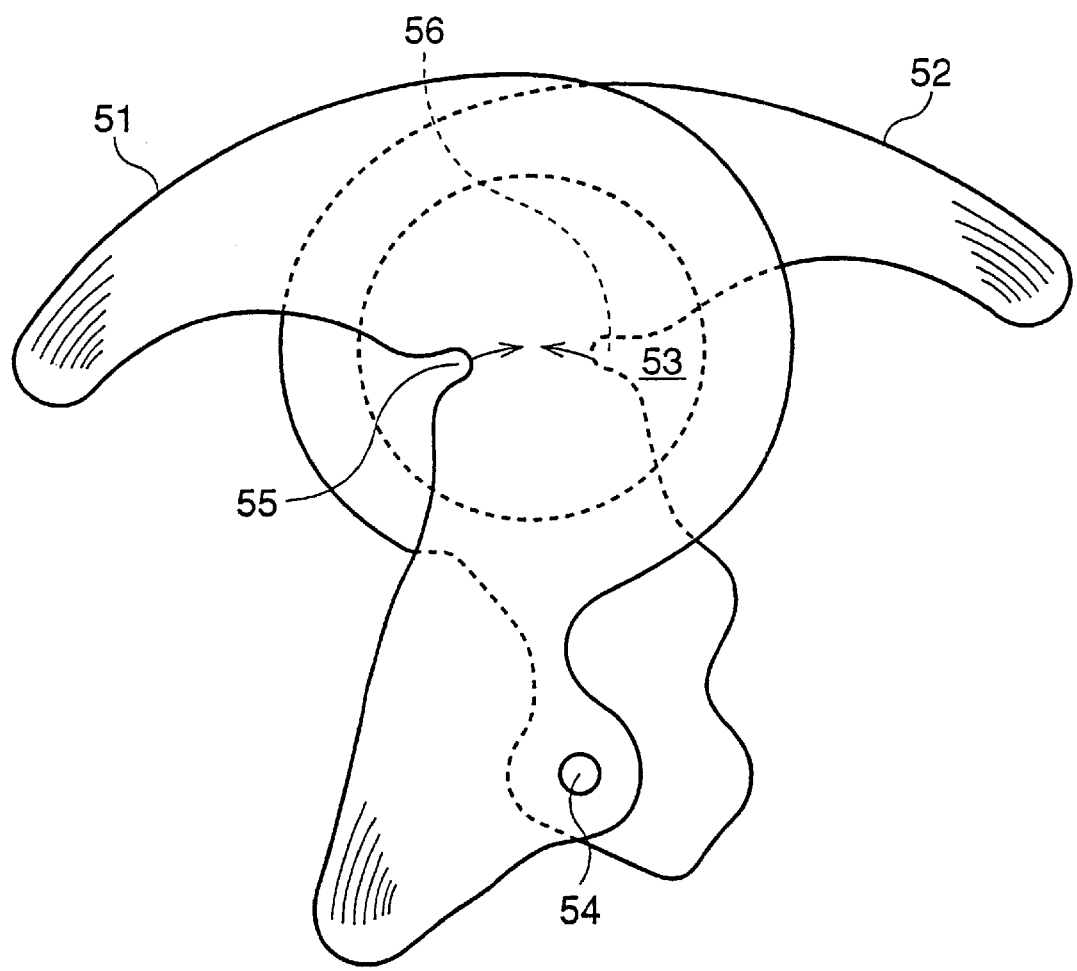
FIG. 6 is a top view illustrating lens shutter blades, one example of the light-shielding blades associated with the present invention.

The light-shielding blade made of Be—Al alloy can be used in not only a focal plane shutter device but also a lens shutter device. FIG. 6 shows shapes of lens shutter blades made of Be—Al alloy. A mechanism for driving these blades are well known and therefore omitted from the figure. As shown, a pair of shutter blades 51 and 52 are arranged to cover an opening 53. Each of the shutter blades is pivotally supported such that the blade swings around a fulcrum arranged at a position spaced from the center of the opening by a predetermined distance. The pair of light-shielding blades are driven by driving means, not shown, to travel in the opposite directions, thereby opening and closing the opening 53. In the illustrated state, the opening 53 is fully closed. From this state, the shutter blade 51 swings clockwise while the shutter blade 52 swings counterclockwise. At this moment, dents 55 and 56, called teardrops, first overlap with each other, upon which the opening 53 starts to open from its center. At this moment, when the travel of the shutter blades 51 and 52 stops, a so-called small stop state is obtained. The teardrops 55 and 56 are provided to lower an error of the small stop state if there is a dispersion in the rotary angle of the shutter blades.

As described and according to the invention, Be—Al alloy featuring light weight and high stiffness is used for the blade material of a focal plane shutter and so on. Use of such a blade material increases the degree of freedom in the design of focal plane shutters, thereby making it practical to design an ultra-high-speed shutter of 1/12000 second or higher. This blade material is also applicable to other shutters than a focal plane shutter, thereby producing significant effects in functional enhancement and cost reduction. Currently, CFRP is a known material which is ever lightest and stiffest for use in focal plane shutters. However, CFRP has drawbacks in quality stability, yield, and cost, and therefore cannot satisfy the requirements for still higher shutter speeds. Use of Be—Al alloy for the blade material according to the present invention can solve these drawbacks of the conventional CFRP and other composite materials, which have problems of local defects due to unaligned carbon fibers, difference in strength of thin sheet in lateral and longitudinal directions, damages due to crimping and knocking out, yield, and cost.

While the preferred embodiments of the present invention have been described using specific terms, such description is for illustrative purposes only, and it is to be understood that changes and variations may be made without departing from the spirit or scope of the appended claims.

What is claimed is:

1. A method of fabricating a light-shielding blade for use in a camera, said method comprising the steps of:

forming a sheet of a desired thickness by hot-calendaring a beryllium-aluminum alloy material containing at least 40% by weight of beryllium, the hot-calendaring being performed such that a material block made of beryllium-aluminum alloy is tightly held for calendering between flat plates having heat resistance and being infusible to form said sheet; and cold-calendering or pressing by flat plates said sheet to a thickness of 40 to 150 microns and desired hardness and planarity.

2. A method of fabricating a light-shielding blade for use in a camera, said method comprising the steps of:

forming a sheet of a desired thickness by hot-calendering a beryllium-aluminum alloy material containing at least 40% by weight of beryllium, the hot-calendering being performed such that a material block made of beryllium-aluminum alloy is tightly held for calendering between flat plates having heat resistance and being infusible to form said sheet;

cold-calendering or pressing by flat plates said sheet to a thickness of 40 to 150 microns and desired hardness and planarity; and dip-coating the sheet on both sides thereof with a black lubricant coating.

* * * * *